(12) United States Patent
Mason

(10) Patent No.: US 10,091,179 B2
(45) Date of Patent: Oct. 2, 2018

(54) USER AUTHENTICATION FRAMEWORK

(71) Applicant: SAP SE, Walldorf (DE)

(72) Inventor: Leigh Robert Mason, Cranebrook (AU)

(73) Assignee: SAP SE, Walldorf (DE)

(*) Notice: Subject to any disclaimer, the term of this patent is extended or adjusted under 35 U.S.C. 154(b) by 27 days.

(21) Appl. No.: 15/149,179

(22) Filed: May 8, 2016

(65) Prior Publication Data

US 2017/0324719 A1 Nov. 9, 2017

(51) Int. Cl.
*H04L 29/06* (2006.01)
*H04L 29/08* (2006.01)

(52) U.S. Cl.
CPC ........ *H04L 63/08* (2013.01); *H04L 63/0807* (2013.01); *H04L 63/10* (2013.01); *H04L 63/108* (2013.01); *H04L 63/168* (2013.01); *H04L 67/02* (2013.01); *H04L 67/10* (2013.01); *H04L 67/42* (2013.01)

(58) Field of Classification Search
CPC .............................. H04L 63/08; H04L 63/10
See application file for complete search history.

(56) References Cited

U.S. PATENT DOCUMENTS

2014/0282977 A1* 9/2014 Madhu ................. G06Q 50/265
726/7
2016/0205108 A1* 7/2016 Si .......................... H04L 63/102
726/4

* cited by examiner

*Primary Examiner* — Izunna Okeke
(74) *Attorney, Agent, or Firm* — Klarquist Sparkman, LLP

(57) ABSTRACT

Described herein is a framework to authenticate users. In accordance with one aspect of the framework, an authentication library is provided to implement an authentication process. The authentication library comprises computer-readable program code to create a request for an access token, send the request to the authorization server, deconstruct a response from the authorization server to extract the access token, and return the access token for use in accessing one or more resources.

14 Claims, 3 Drawing Sheets

USER AUTHENTICATION FRAMEWORK

TECHNICAL FIELD

The present disclosure relates generally to computer systems, and more specifically, to a user authentication framework.

BACKGROUND

Data may need to be copied, processed, transferred or manipulated at remote data processing resources for it to be useable at a client application server. In some other instances, a central database may also be used to provide access to data processing resources for multiple applications or business products running on several remote data processing devices.

Authentication protects the confidentiality, integrity and availability of the data flow. Open standard for authorization ("OAuth") is an open protocol designed to allow secure authorization in a simple and standard method from web, mobile and desktop applications. OAuth allows clients to access server resources on behalf of a resource owner (e.g., different client or end-user). OAuth also provides a process for end-users to authorize third-party access to their server resources without sharing their credentials using user-agent redirections.

SUMMARY

A framework for facilitating authentication of users is described herein. In accordance with one aspect of the framework, an authentication library is provided to implement an authentication process. The authentication library comprises computer-readable program code to create a request for an access token, send the request to the authorization server, deconstruct a response from the authorization server to extract the access token, and return the access token for use in accessing one or more resources.

With these and other advantages and features that will become hereinafter apparent, further information may be obtained by reference to the following detailed description and appended claims, and to the figures attached hereto.

BRIEF DESCRIPTION OF THE DRAWINGS

Some embodiments are illustrated in the accompanying figures, in which like reference numerals designate like parts, and wherein.

DETAILED DESCRIPTION

In the following description, for purposes of explanation, specific numbers, materials and configurations are set forth in order to provide a thorough understanding of the present frameworks and methods and in order to meet statutory written description, enablement, and best-mode requirements. However, it will be apparent to one skilled in the art that the present frameworks and methods may be practiced without the specific exemplary details. In other instances, well-known features are omitted or simplified to clarify the description of the exemplary implementations of the present framework and methods, and to thereby better explain the present framework and methods. Furthermore, for ease of understanding, certain method steps are delineated as separate steps; however, these separately delineated steps should not be construed as necessarily order dependent in their performance.

A framework for authenticating users is described herein. In accordance with one aspect, an object-oriented library that implements a token-based authentication process is provided. The classes in the library implement the access token request and response message flow for access to resources (e.g., web services) without the requirement to pass user credentials. The library may be plugged into an application (e.g., .net project) that requires authentication or authorization by the authentication server.

It should be appreciated that the framework described herein may be implemented as a method, a computer-controlled apparatus, a computer process, a computing system, or as an article of manufacture such as a computer-usable medium. These and various other features and advantages will be apparent from the following description.

Figure 1:
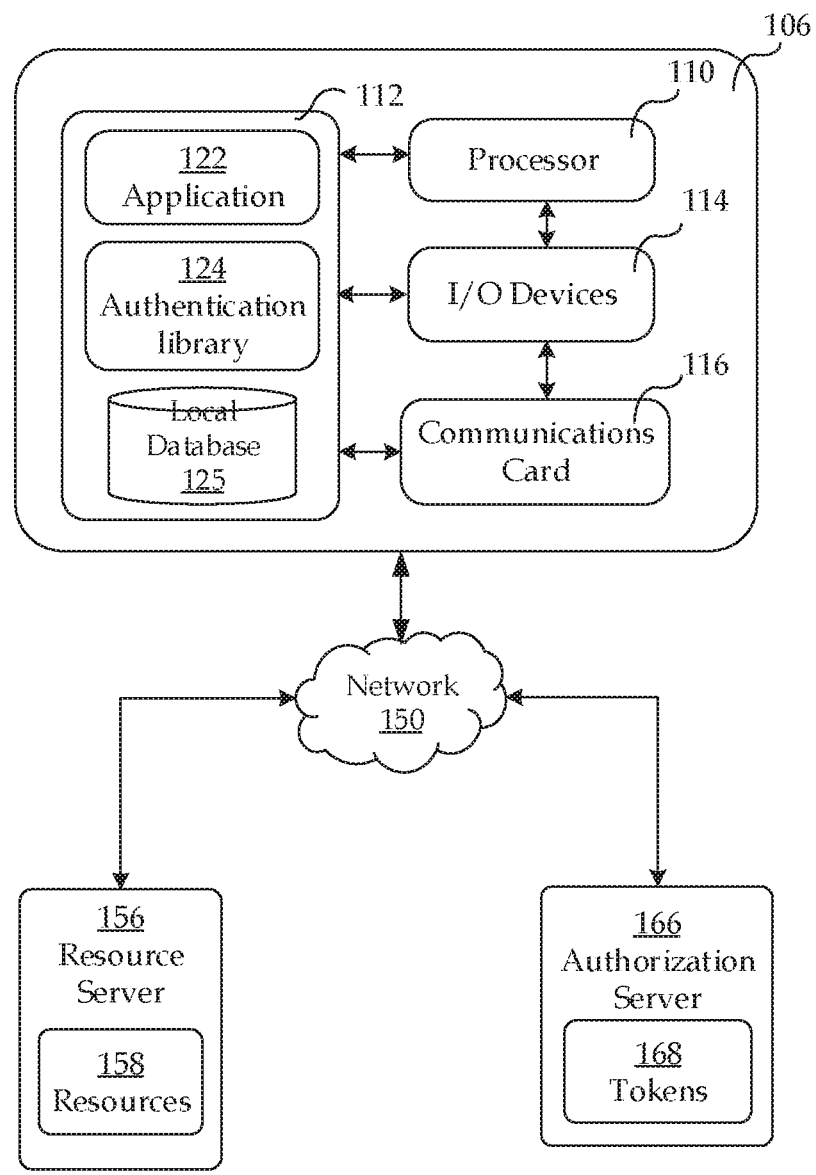
FIG. 1 is a block diagram illustrating an exemplary architecture.

FIG. 1 is a block diagram illustrating an exemplary architecture 100 in accordance with one aspect of the present framework. Generally, exemplary architecture 100 may include a client (or client device) 106 communicatively coupled to a resource server 156 and an authorization server 166. Client device 106 may serve as a front-end interface with a user (or software developer). There may be any number of clients 106 associated with, or external to, architecture 100. Additionally, there may also be one or more additional clients 106 external to the illustrated portion of architecture 100 capable of interacting with the architecture 100 using the network 150.

Resource server 156 and authorization server 166 may serve as backend systems to provide resources (or services) and authenticate the user at client device 106 respectively. In some implementations, resource server 156 and authorization server 166 co-reside on a single server or system. At least some of the communications between the client 106 and the resource and authorization servers (156, 166) may be performed across or using network 150 (e.g., wide area network (WAN) such as the Internet).

In some implementations, the resource and authorization servers (156, 166) process data input received from the client device 106 by using the Open Data Protocol (OData). The OData protocol is a data access protocol designed to provide standard create, read, update and delete access to a data source using a website. OData may be used to access table-like structures similar to the way Structured Query Language (SQL) does with data in a database. The OData service contains an entity collection and may be defined by a metadata document (e.g., .edmx schema). In some implementations, the servers (156, 166) communicate with client device 106 using the OData protocol through hypertext transfer protocol (HTTP) or hypertext transfer protocol secure (HTTPS) requests.

The client 106 may be associated with a particular network application or a development context, as well as a particular platform-based application system (e.g., .NET framework). The client 106 may be any computing device operable to connect to or communicate with at least one of the servers (156, 166) using a wireline or wireless connection via the network 150, or another suitable communication means or channel. In some instances, the client 106 may be a part of or associated with a business process involving one or more network applications, or alternatively, a remote developer associated with the platform or a related platform-based application.

In general, the client 106 may include a processor 110, input/output (I/O) devices 114 (e.g., touch screen, keypad, touch pad, display screen, speaker, etc.), a memory module 112 and/or a communications card or device 116 (e.g., modem and/or network adapter) for exchanging data with a network (e.g., local area network or LAN, wide area network (WAN), Internet, etc.). It should be appreciated that the different components and sub-components of the client device 106 may be located or executed on different machines or systems.

Memory module 112 may be any form of non-transitory computer-readable media, including, but not limited to, dynamic random access memory (DRAM), static random access memory (SRAM), Erasable Programmable Read-Only Memory (EPROM), Electrically Erasable Programmable Read-Only Memory (EEPROM), flash memory devices, magnetic disks, internal hard disks, removable disks or cards, magneto-optical disks, Compact Disc Read-Only Memory (CD-ROM), any other volatile or non-volatile memory, or a combination thereof. Memory module 112 serves to store machine-executable instructions, data, and various software components for implementing the techniques described herein, all of which may be processed by processor 110. As such, client device 106 is a general-purpose computer system that becomes a specific-purpose computer system when executing the machine-executable instructions. Alternatively, the various techniques described herein may be implemented as part of a software product. Each computer program may be implemented in a high-level procedural or object-oriented programming language (e.g., C, C++, C#, Java, JavaScript, Advanced Business Application Programming (ABAP') from SAP® AG, Structured Query Language (SQL), etc.), or in assembly or machine language if desired. The language may be a compiled or interpreted language. The machine-executable instructions are not intended to be limited to any particular programming language and implementation thereof. It will be appreciated that a variety of programming languages and coding thereof may be used to implement the teachings of the disclosure contained herein.

Memory module 112 may store an application or application interface 122, an authentication library 124 and a local database 125. The application 122 may enable the client 106 to access and interact with modules and data in resource and authorization servers (156, 166). The application 122 allows the client 106 to request and view content on the client 106. In some implementations, the application 122 can be and/or include a web browser. In some implementations, the application 122 uses parameters, metadata, and other information received at launch to access a particular set of data from the servers 156 and 166. Once a particular application 122 is launched, the client can process a task, event or other information which may be associated with the servers 156 and 166. Further, although illustrated as a single application 122, the application 122 may be implemented as multiple client applications in the client 106.

Resource and authorization servers 156, 166 may include electronic computing devices operable to receive, transmit, process, store, or manage data and information associated with the architecture 100. Resource server 156 and authorization server 166 may include components similar to client 106, such as a processor, memory module, I/O devices, communication card, and so forth. In some instances, resource server 156 and authorization server 166 and its illustrated components may be separated into multiple components executing at different servers and/or systems.

Resource and authorization servers 156, 166 may serve to receive requests from one or more clients 106 and respond to the received requests by processing said requests in an on-demand platform and/or an associated network application, and send the appropriate responses from the appropriate component back to the requesting client 106. Components of the resource and authorization servers 156, 166 can also process and respond to local requests from a user locally accessing the servers 156, 166. Accordingly, in addition to requests from the client 106, requests associated with a particular component may also be sent from internal users, external or third-party customers, and other associated network applications, business processes, as well as any other appropriate entities, individuals, systems, or computers.

In addition, resource server 156 may store and execute one or more remote resources 158 (e.g., Odata services) in its memory module. A user or developer may access the application 122 on client device 106 through a browser or any other suitable computer program, and the application 122 may require access to one or more remote resources 158 executed by a resource server 156. The resource server 156 may be implemented as a single server or as a server platform with multiple servers.

The authorization server 166 may include a memory module (e.g., a database) for storing configuration information and access tokens 168. In some implementations, authorization server 156 implements a token-based authentication process (e.g., OAuth) that provides to clients a "secure delegated access" to server resources on behalf of a resource owner. It specifies a process for resource owners to authorize third-party access to their server resources without sharing their credentials. The authorization server 166 may issue access tokens to third-party clients 106, with the approval of the resource owner. The client 106 then uses the access token to access the protected resources hosted by the resource server 156.

The client device 106 and/or the servers 156, 166 may include development technology and hosted and managed services and applications built on top of the underlying platform technologies. The platform technology for the client device 106 may be different from the platform technology for the servers 156, 166. For example, the application 122 implemented on client device 106 may be built based on the .NET software framework developed by Microsoft, while the resources 158 (e.g., SAP Gateway OData services or web services) provided by servers 156, 166 may be built on SAP NETWEAVER Application Server or other platforms. Authentication library 124 may provide configuration data, documentation, help data, message templates, pre-written computer-readable program code and subroutines, classes, values or type specifications to connect the different platform technologies. Authentication library 124 may process (e.g., encapsulate) the token request and response messages to and from the authentication server 166 to obtain access to resources 158 hosted by resource server 156. Authentication library 124 may be plugged into the application 122 (e.g., project) which requires authentication by authentication server 166 for accessing the resources 158.

Figure 2:
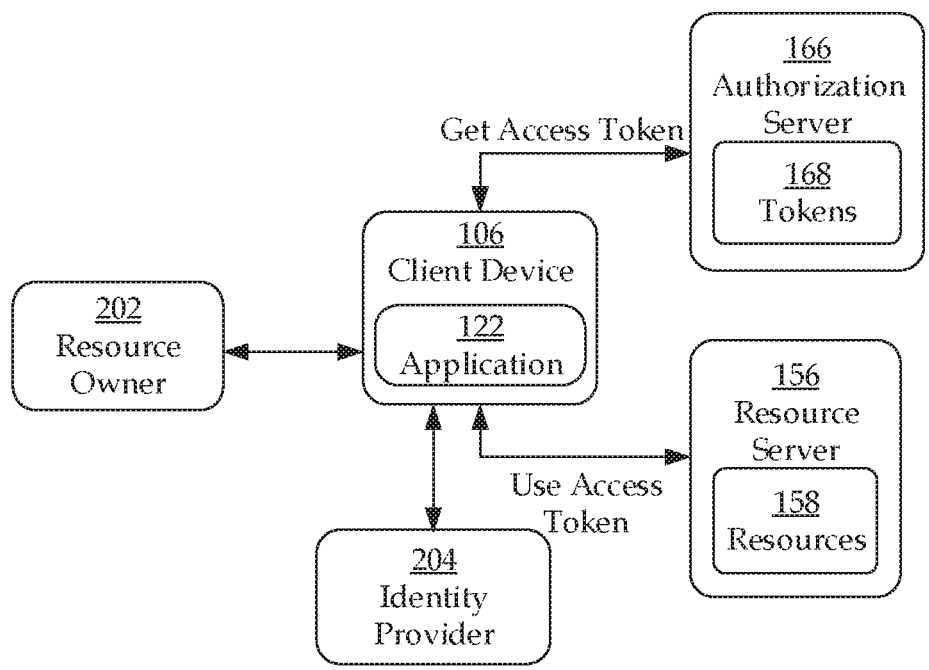
FIG. 2 illustrates an exemplary message flow during an authentication process.

FIG. 2 illustrates an exemplary message flow 200 during an authentication process. The authentication process may be based on, for example, OAuth 2.0 or any other token-based authorization method. A user may access, via client device 106, selected resources provided by resource server

156 using an application 122 without being forced to supply his or her user's login credentials (e.g., username and password).

The client device 106 may receive an assertion (e.g., Security Assertion Markup Language or SAML 2.0 bearer) from an identity provider 204. The assertion contains user information of the resource owner 202 and has a digital signature from the identity provider 204. The application 122 requests an access token 168 from the authorization server 166. In exchange for the assertion, the authorization server 166 issues an access token 168 after having checked the client credentials, the trust relationship with the identity provider 204, and the authorization of the client 106 and the resource owner 202 for the requested scopes. To access a requested resource, the client 106 embeds the access token 168 into an authorization header and forwards it with the resource request to the resource server 156. The resource server 156 grants access to the requested resource 158 if it is covered by one of the scopes assigned to the access token.

The message flow 200 may be implemented by authentication library 124 when consumed in an application 122 (e.g., .NET application) that requires authentication by authorization server 166 to access to one or more remote resources 158 stored resource server 156. In some implementations, the authentication library 124 is programmed using an object-oriented language (e.g., C#) or any other language supported by the application 122 (e.g., C# .NET project). The authentication library 124 may be compiled into a dynamically linked library (.dll) for consumption by the application 122 to implement a token-based authentication process. One example of such token-based authentication process is implemented by OAuth2.0 flow with Security Assertion Markup Language (SAML) bearer assertion.

In some implementations, the authentication library 124 includes at least 4 classes: (1) Client; (2) AccessTokenRequest; (3) AccessTokenResponse; and (4) AccessToken. An additional class IdentityProvider may be provided in certain instances.

The instantiation of the Client class is the entry point into the authentication process, and represents the calling client device 106 that wants to obtain an access token. The Client object stores the identifier of the client device, the user identifier and password. The Client object may further instantiate objects from AccessTokenRequest and AccessTokenResponse, and return the AccessToken to the resource server 156 to access a requested resource.

The AccessTokenRequest class may be instantiated to create the hypertext transfer protocol (HTTP) request for the access token which may store, for example, the client device identifier or ID (e.g., username for the application that requests access to the resources), any assertion received from the identity provider 204, and a list of one or more scopes for the requested resources. The AccessTokenRequest class may further encode the contents of the request, set HTTP headers and/or send the request to the specified authorization server 166.

The AccessTokenResponse class reads the HTTP response from the authorization server 166 and deconstructs (e.g., deserializes) the response body to generate an object of pre-defined type AccessToken. The AccessTokenResponse class may further calculate the time of expiry of the access token.

The AccessToken class stores the attributes for the access token provided by the authorization server 166. In some implementations, the AccessToken stores the access token identifier, the access token type, the expires-in value, the expiry date or time and the scope of the access token. The scope defines which resource at the resource server 156 shall be accessed.

The IdentityProvider class is a base class for obtaining an assertion (e.g., SAML2.0 assertion) from an identity provider 204. The developer may also plug in their own service call to a third party Identity Provider (IDP) solution to obtain an assertion.

To use the library, the developer may first import (or plug-in) the authentication library 124 into the application 122. The developer may then instantiate the Client object and inject the assertion token retrieved from either the identity provider or an enterprise IDP solution. Once the AccessToken class has been instantiated, the developer may then use this to pass to their own representational state transfer (REST) implementation within the application platform technology to access resources at the resource server 156.

Figure 3:
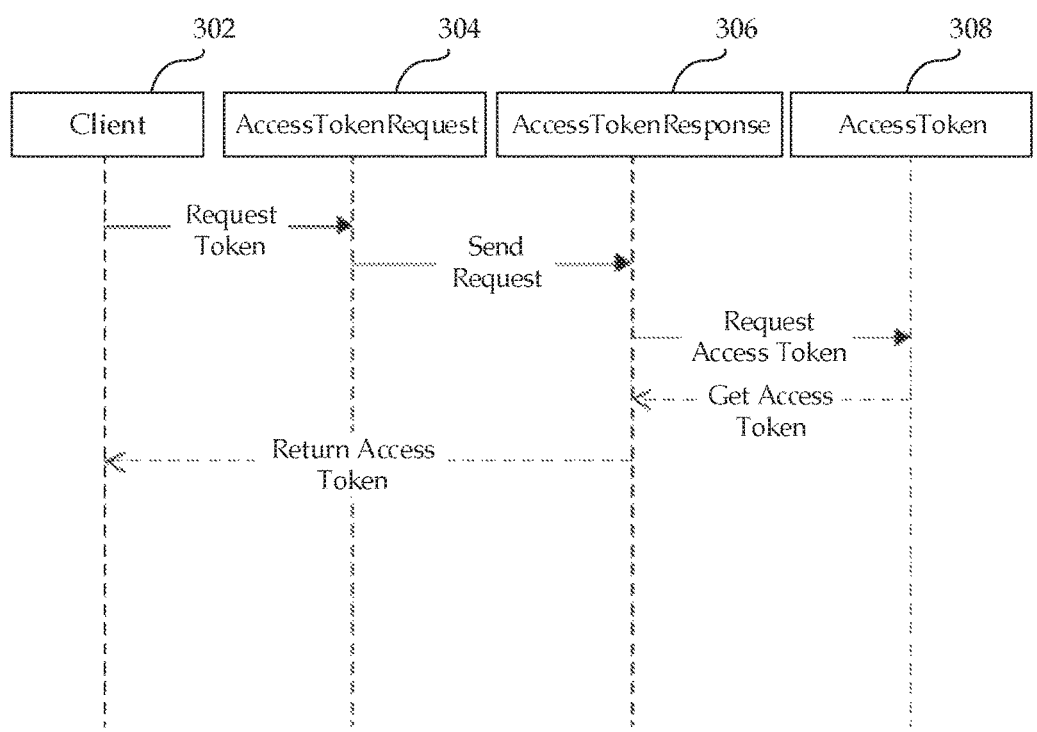
FIG. 3 is an exemplary sequence diagram of messages flowing between objects.

FIG. 3 is an exemplary sequence diagram of messages flowing between objects (302, 304, 306, 308) instantiated from the different classes (Client, OAuth AccessTokenRequest, AccessTokenResponse, AccessToken). First, the Client object 302 sends a request for an access token to the AccessTokenRequest object 304. The AccessTokenRequest object 304 then sends a token request to the specified authorization server 166. The AccessTokenResponse object 306 receives response from the authorization server 166 and requests an access token from the AccessToken object 308. The response is deconstructed and an AccessToken object 308 is returned to the AccessTokenResponse 306. The AccessTokenResponse 306 then returns the AccessToken object 308 to the client object 302.

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

The invention claimed is:

1. A user authentication system, comprising:
   a non-transitory memory device for storing an authentication library that is consumed by an application that requires authentication by an authorization server to access one or more resources stored in a resource server, wherein the authentication library comprises computer-readable program code; and
   a processor in communication with the memory device, the processor being operative with the computer-readable program code to:
   obtain an assertion from an identity provider,
   invoke a token-based authentication process defined in the authentication library to:
   create a request, including the assertion, for an access token for accessing the one or more resources stored in the resource server;
   send the request to the authorization server via a computer network;
   deconstruct a response from the authorization server to extract the access token, wherein the deconstruction comprises deserializing the response and generating an object of a pre-defined type, wherein the object stores an access token identifier, an access token type, an expires-in value, an expiry time, a scope of the access token, or a combination thereof; and return the access token to the application for use in accessing the one or more resources stored in the resource server via the computer network.

2. The system of claim 1 wherein the application comprises a .NET framework application.

3. The system of claim 2 wherein the resource server comprises a NETWEAVER application server.

4. The system of claim 1 wherein the request for the access token comprises a hypertext transfer protocol (HTTP) request.

5. The system of claim 1 wherein the request for the access token comprises a client device identifier, an assertion received from an identity provider and a list of one or more scopes.

6. A non-transitory computer-readable medium having stored thereon program code, the program code executable by a computer to perform steps comprising:
   obtaining an assertion from an identity provider; and
   executing a token-based authentication process defined in an authentication library, wherein the executing comprises:
      creating a request, including the assertion, for an access token for accessing the resource stored in the resource server,
      sending the request to an authorization server over a computer network,
      deconstructing a response from the authorization server to extract the access token, wherein the deconstructing comprises deserializing a body of the response and generating an object of a pre-defined type, wherein the object stores an access token identifier, an access token type, an expires-in value, an expiry time, a scope of the access token, or a combination thereof, and
      returning the access token to the application for use in accessing the resource stored in the resource server.

7. The non-transitory computer-readable medium of claim 6, wherein the program code is executable by the computer to create the request for the access token via a client object that represents a calling client device.

8. The non-transitory computer-readable medium of claim 6, wherein the program code is executable by the computer to create the request for the access token by creating a hypertext transfer protocol (HTTP) request.

9. The non-transitory computer-readable medium of claim 6, wherein the program code is executable by the computer to create the request for the access token by creating a request that comprises a client device identifier, the assertion received from the identity provider, and one or more scopes for the one or more resources.

10. The non-transitory computer-readable medium of claim 6, wherein the program code is executable by the computer to create the request for the access token by encoding the request and setting hypertext transfer protocol (HTTP) headers.

11. The non-transitory computer-readable medium of claim 6, wherein the steps further comprise calculating the time of expiry of the access token.

12. The non-transitory computer-readable medium of claim 6, wherein the assertion comprises a Security Assertion Markup Language (SAML) assertion.

13. A method performed by one or more computing devices, the method comprising:
   obtaining an assertion from an identity provider; and
   invoking a token-based authentication process defined in the authentication library, wherein the invoking comprises:
      creating a request, including the assertion, for an access token for accessing the resource stored in the resource server,
      sending the request to an authorization server over a computer network,
      deconstructing a response from the authorization server to extract the access token, wherein the deconstructing comprises deserializing the response and generating an object of a pre-defined type, wherein the object stores an access token identifier, an access token type, an expires-in value, an expiry time, a scope of the access token, or a combination thereof, and
      returning the access token to the application for use in accessing the resource stored in the resource server.

14. The method of claim 13, wherein the request is created via a client object that represents a calling client device.

* * * * *